Aug. 7, 1951   J. S. DIX ET AL   2,563,317
LOCKING DEVICE FOR LUGGAGE COMPARTMENT LIDS
Filed June 20, 1949   2 Sheets-Sheet 1

Inventors
James S. Dix
Mitchell M. Timmons

By *Clarence A. O'Brien and Harvey B. Jacobson*
Attorneys

Aug. 7, 1951
J. S. DIX ET AL
2,563,317
LOCKING DEVICE FOR LUGGAGE COMPARTMENT LIDS
Filed June 20, 1949
2 Sheets-Sheet 2
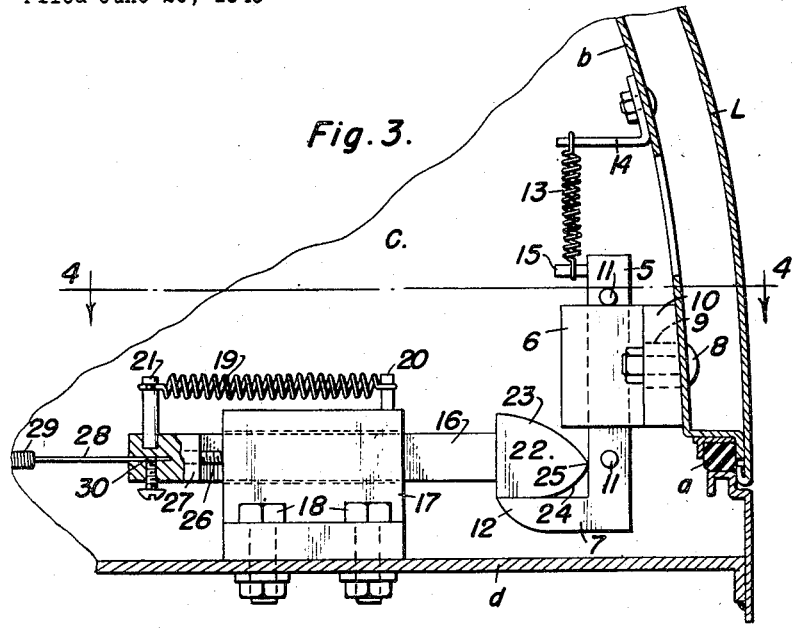
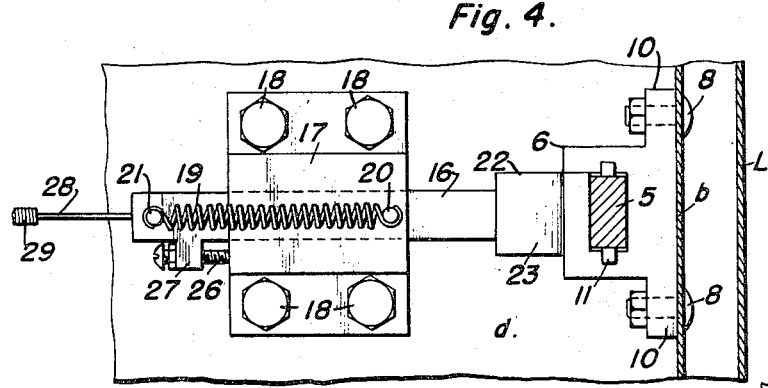
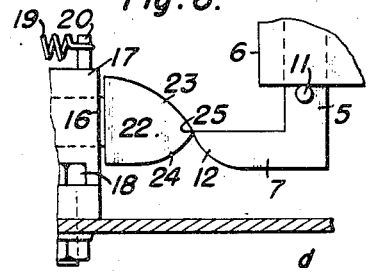
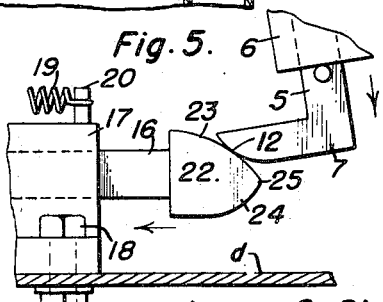
Inventors
James S. Dix
Mitchell M. Timmons
By Clarence A. O'Brien
and Harvey B. Jacobson
Attorneys Patented Aug. 7, 1951

2,563,317

UNITED STATES PATENT OFFICE 2,563,317

LOCKING DEVICE FOR LUGGAGE COMPARTMENT LIDS

James S. Dix and Mitchell M. Timmons, Mount Airy, N. C.

Application June 20, 1949, Serial No. 100,286

1 Claim. (Cl. 292—171)

This invention relates to an improved device for locking the lid of an automobile luggage compartment in closed position, the primary object of the invention being to provide such a device including a spring-projected locking bolt which is mounted in the luggage compartment and may be retracted or released by means which is operable only at the instrument board of the automobile and which is accessible only from within the automobile, so that when the doors of the automobile are closed and locked the lid cannot be opened and articles can not be surreptitiously removed from the luggage compartment.

Another object is to provide a locking device of the above kind including a vertically movable keeper having an arm over which the locking bolt is projected, when the lid is tightly closed, to lock said lid in closed position, a spring being provided to raise said keeper, when the bolt is released, so that the keeper will hold the bolt retracted until the lid is opened or until it is pressed down to tightly closed position after normal closing thereof.

A further object is to provide the bolt and the keeper arm with co-acting bevelled surfaces, so that the keeper will force the bolt to retracted position and the bolt will then be projected to depress the keeper and engage over the arm of the latter to lock the lid when the latter is tightly closed.

The exact nature of the present invention, as well as other objects and features thereof, will become apparent from the following description when considered with the accompanying drawings, in which:

Figure 3 is an enlarged fragmentary view of the keeper, locking bolt and adjacent parts as shown in Figure 1.

Figure 4 is a horizontal section taken on the line 4—4 of Figure 3.

Figure 5 is a fragmentary view showing adjacent portions of the keeper and locking bolt and illustrating the manner in which the keeper cams the bolt to retracted position when the lid is closed.

Figure 6 is a view somewhat similar to Figure 5, showing how the keeper holds the bolt in retracted position after the latter is released and until the lid is raised or until it is pressed down tightly in closed position.

Figure 1:
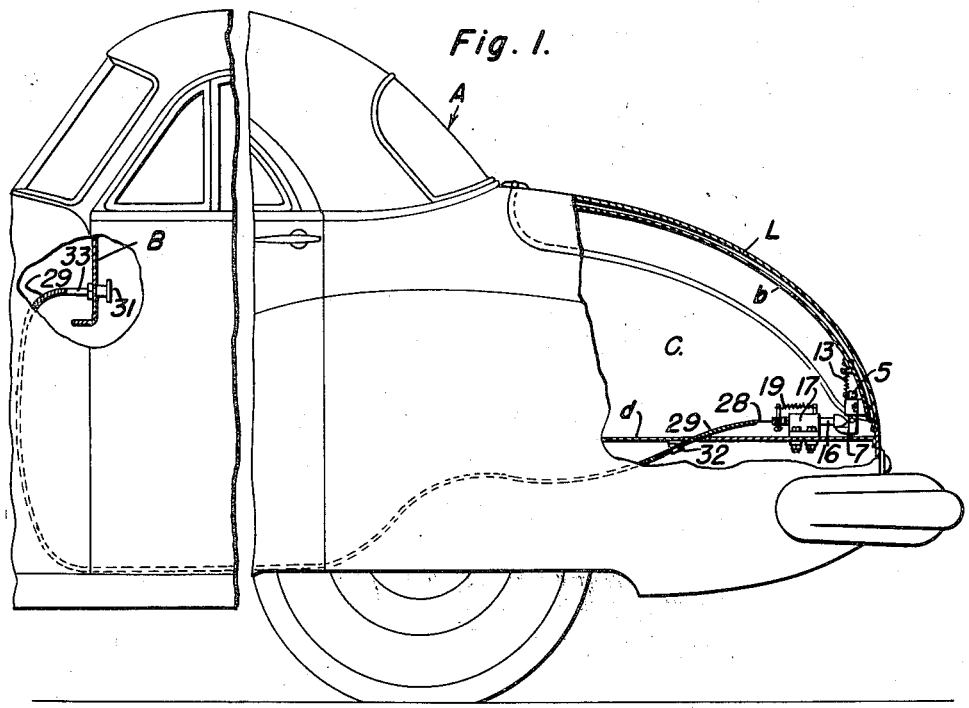
Figure 1 is a fragmentary view of an automobile, partly in side elevation and partly broken away and in section, equipped with a locking device embodying the present invention.

Referring in detail to the drawings, A indicates an automobile having a rear luggage compartment C closed by a hinged lid L, and provided with an instrument board B, said lid having the usual resilient sealing strip —a— along its edges to provide a watertight closure when the lid is closed.

The present invention provides a device for locking the lid L in closed position which is releasable from the driver's seat of the automobile by means which is accessible only from within the latter. As shown, this locking device includes a vertical movable L-shaped keeper whose longer vertical arm 5 is slidable in a guide bracket 6 secured to the inside and arranged near the lower edge of the lid, and whose lower horizontal arm 7 projects forwardly. The bracket 6 is vertically adjustable and preferably secured to the lid by means of nut equipped bolts 8 extending through the inner wall —b— of said lid and through vertical elongated slots 9 provided in side base flanges 10 of said bracket. Vertical movement of the keeper is limited in opposite directions by means of cross pins 11 coacting with the bracket 6 and passing through and projecting beyond opposite sides of the arm 5 above and below said bracket. The free end of arm 7 is beveled at 12 on its under side, and the keeper is yieldingly elevated by means of a helical tension spring 13 connected at its upper end to an angle bracket 14 secured to the lid above the bracket 6 and at its lower end to a pin 15 fixed to the upper end of arm 5.

Figure 2:
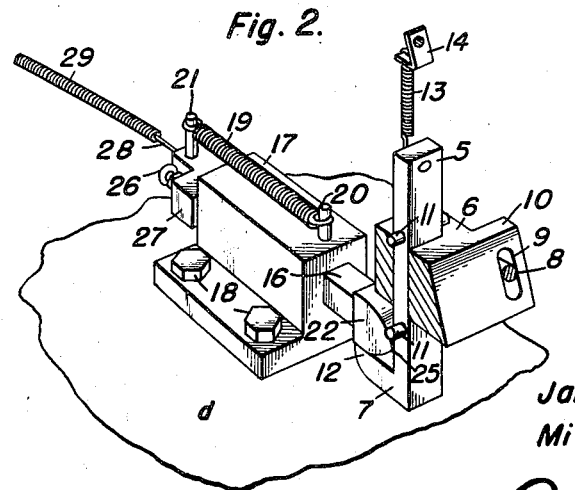
Figure 2 is an enlarged fragmentary perspective view, partly in section, showing the keeper, locking bolt and adjacent parts.

The locking device also includes a horizontally movable locking bolt 16 which is slidable in a guide bracket 17 bolted at 18 on the floor —d— of the luggage compartment directly in front of the keeper. The bolt 16 is yieldingly projected rearwardly by means of a helical tension spring 19 which is stronger than the spring 13, and which is attached at its rear end to an upstanding pin 20 fixed to bracket 17 and at its front end to an upstanding pin 21 fixed to the bolt 16. At its rear end, the bolt 16 has a head 22 beveled on its upper side as at 23 and on its under side as at 24, the beveled surfaces of said head merging at the free rear end of the latter to provide a nose 25. The arrangement is such that when the lid L is closed, the arm 7 cams the bolt 16 forwardly to retracted position by engagement of the beveled surface 12 of arm 7 with the upper beveled surface 23 of head 22, as shown in Figure 5. By pressing the lid down tightly after normal closing thereof as allowed by slight yielding of the sealing strip —a—, the terminal end of arm 7 is caused to pass below the nose 25, whereupon spring 19 forces the bolt 16 rearwardly over the arm 7, the surface 24 acting to cam the keeper downwardly against the action of spring 13, so that the lid is locked tightly closed as shown in Figures 1 to 3 inclusive, with the strip —a— under slight compression. When the bolt 16 is retracted against the action of spring 19 from the locking position of Figure 3, the keeper is elevated by spring 13, and strip —a— expands to crack or slightly raise the lid so that the terminal of arm 7 is disposed against the nose 25 at the juncture of surfaces 23 and 24 to hold the bolt 16 retracted as shown in Figure 6. Thus, the lid remains unlocked without manually holding the bolt 16 in retracted position so that said lid can be opened by the same person who previously released the bolt from within the automobile by a means to be presently described. When the lid is normally closed with the keeper and the bolt again related as shown in Figure 6, downward pressure on the lid will move the terminal of arm 7 slightly below the nose 25 so that the bolt will be projected to the locking position of Figure 3 by spring 19, as before stated. This is true because spring 19 is stronger than spring 13 and accordingly causes the keeper to be cammed downwardly against the action of the latter spring by the riding of surface 24 over the terminal of arm 7. Movement of the bolt 16 to projected or locking position is properly limited by an adjustable stop screw 26 engageable with bracket 17 and threaded through a lug 27 provided on one side of said bolt in front of said bracket.

The operating means for manually retracting the bolt 16 from the driver's seat or from within the automobile, consists of a Bourdon wire device including a spring wire 28 which extends through a flexible tube 29. The wire 28 is attached to one end to the front end of bolt 16 as at 30, and secured on the other end of said wire is a knob 31 located at the instrument board so as to be accessible from the driver's seat for being pulled to release the bolt. Near its rear end, the tube 29 is anchored by a clamp 32, while its other end is attached to a sleeve 33 mounted in an opening provided in the instrument board. It will be evident that the lid L will be unlocked and maintained in unlocked position when the wire 28 is pulled to retract bolt 16 and allow the spring 13 to raise the keeper and the sealing strip —a— to slightly raise the lid so that the arm 7 of the keeper engages the nose 25 of the bolt as shown in Figure 6. The wire 28 can be released without danger of the bolt being projected to locking position unless the lid is pressed downwardly so as to compress the strip —a— and cause the terminal of arm 7 to pass from the nose 25 to the lower beveled surface 24 of the bolt. Thus, after unlocking the lid, the same party may release the wire 28 and go to the back of the car and open the lid. The manner in which the lid is locked when closed again has already been explained.

From the foregoing description, the construction, operation and advantages of the invention will be apparent to those skilled in the art. Modifications and changes in details of construction are contemplated within the spirit and scope of the invention as claimed.

What is claimed as new is:

In a locking device for the hinged lid of an automobile luggage compartment, wherein the lid rises slightly when unlocked, in combination, a vertically movable keeper mounted on the inside of the lid and including a horizontal arm having a free forward end provided with a beveled surface on its under side, a spring acting to yieldingly elevate said keeper, means to limit movement of said keeper, a horizontally movable locking bolt mounted in the luggage compartment, a stronger spring yieldingly acting to project said bolt rearwardly to engage over said arm of the keeper for locking the lid closed when pressed down to tightly closed position, said bolt having a free rear end provided with beveled surfaces on its upper and under sides to provide a nose at the juncture of the latter surfaces, the upper bevel surface being engaged by said arm when the keeper is lowered as in the closing of the lid, the lower beveled surface engaging the upper surface of the arm during the locking action and coacting with said stronger spring to bias the keeper downwardly into fully latched position corresponding with the fully closed position of the lid.

JAMES S. DIX.
MITCHELL M. TIMMONS.

REFERENCES CITED

The following references are of record in the file of this patent:

UNITED STATES PATENTS

| Number | Name | Date |
| --- | --- | --- |
| 390,507 | Morton | Oct. 2, 1888 |
| 1,566,997 | Taggart, Jr. | Dec. 22, 1925 |
| 2,200,346 | Sepull | May 14, 1940 |
| 2,548,242 | Rosenbarger | Apr. 10, 1951 |